April 8, 1958     L. OSROW ET AL     2,829,921

DISPENSER UNIT

Filed Sept. 2, 1955

LEONARD OSROW
HAROLD OSROW
        INVENTORS.

BY Abraham Friedman
            Atty

United States Patent Office 2,829,921
Patented Apr. 8, 1958

2,829,921

DISPENSER UNIT

Leonard Osrow and Harold Osrow, Queens Village, N. Y.

Application September 2, 1955, Serial No. 532,214

3 Claims. (Cl. 299—84)

This invention relates to a dispensing unit adapted for connection in a fluid line for the purposes of injecting detergents, insecticides, or the like into the fluid stream.

Various dispensers have been developed for this purpose generally comprising a chamber, filled with the medium to be injected, mounted on the fluid line. The said medium enters the fluid line upon the transverse actuation of a manually operated valve to the open position, said valve being normally closed. Satisfactory operation of such a dispenser unit depends upon a valve seat properly formed within the fluid line walls, adequate valve stem packing and a convenient means for retaining the valve in the closed position.

Consequently it is the general object of this invention to provide a dispensing unit adapted for rapid installation into a fluid line including an improved valvular means simple and economical in structure for varying the flow of detergents, insecticides, etc., into the fluid stream by a simple manual movement of the unit relative to the pipe line.

Another more specific inventive object is the provision of a dispensing unit adapted to be conveniently installed in a fluid pipe line including a chamber filled with detergent, insecticide or the like, said chamber being movable relative to the pipe line to vary the flow from the chamber to the pipe line interior.

A further inventive object is the provision of a dispensing unit adapted for simple installation in a pipe line including a chamber rotatable about a portion of the pipe line whereby communication between the pipe line interior and the chamber can be controlled.

A still further inventive object is the provision of a dispensing unit for detergents, insecticides or the like comprising a fluid line adapted for simple installation in a pipe line and a chamber swivelled on the fluid line whereby rotary movement of the chamber controls the injection of detergent, insecticide, etc. into the fluid stream.

Further objects and inventive details will become apparent from the following detailed description when taken in conjunction with the annexed drawings in which.

Figure 1:
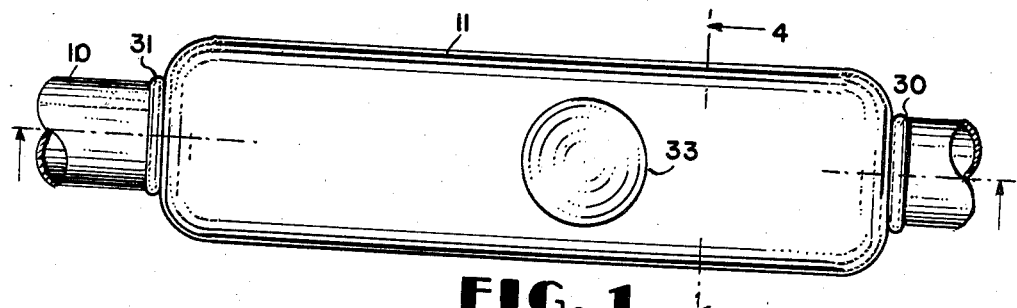
Figure 1 is a plan view of the dispensing unit.

Referring to Figure 1, the dispensing unit is seen to comprise the pipe 10, adapted by conventional coupling means for connection to a pipe line, and the tubular dispensing jacket 11 rotatably mounted upon the pipe 10 and filled with the material to be dispensed.

Figure 2:
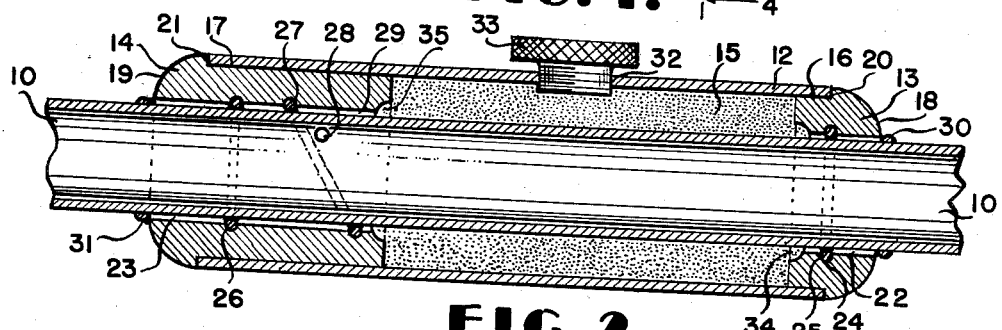
Figure 2 is a longitudinal section showing the "open" position.
Figure 3:
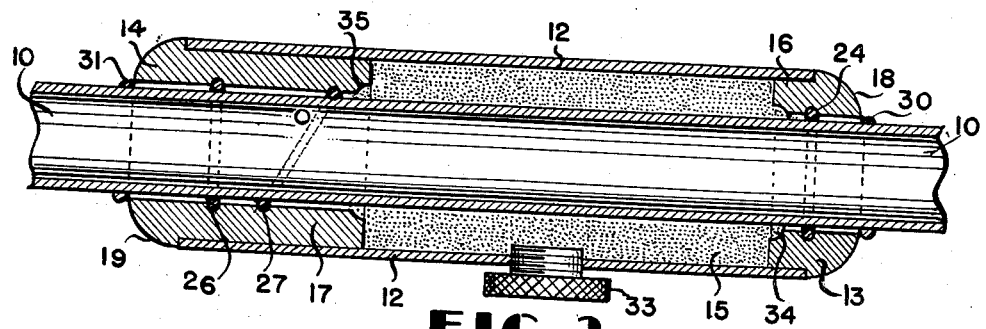
Figure 3 is a longitudinal section through the unit when in the "closed" position.
Figure 4:
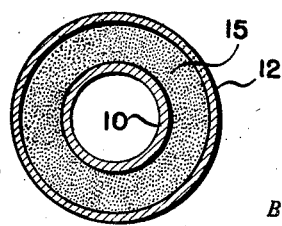
Figure 4 is a transverse section through 4—4 of Figure 1.

In Figures 2, 3 and 4 the jacket 11 is better seen to further comprise an outer cylindrical shell 12 sealingly encompassing reduced portions of spaced opposing stoppers 13 and 14 forming the end walls of a chamber 15 therebetween. Each of the said stoppers include reduced annular portions 16 and 17 which are sealingly encompassed by the opposite ends of the shell 12 and which project axially toward chamber 15 from arcuately tapered ends 18 and 19. Annular shoulders 20 and 21 connect the surfaces of the reduced portions 16 and 17 with the surfaces of the ends 18 and 19 respectively providing an abutment for the transverse edges of the shell ends. Stoppers 17 and 18 are provided with the axial bores 22 and 23 whose diameters are slightly greater than the outer pipe diameter. An O type sealing ring 24 is secured in an annular recess 25 formed in the surface of the bore 22. Similarly the stopper 17 is provided with an outer sealing ring 26 and an inclined sealing ring 27 positioned between the sealing ring 26 and the dispensing chamber 15. Due to the inclination between the axis of the O ring 27 relative to the axis of pipe 10 rotation of the O ring 27 relative to the pipe 10 causes axial displacement along any longitudinal section of the O ring 27. When mounted operatively on the pipe 10 the O rings engage the pipe periphery rotatably and sealingly. A perforation 28 is provided in pipe 10 just inwardly of the pipe surface engaged by O ring 27 as seen in Figure 2. However upon the rotation of jacket 11 through 180° (½ turn) the O ring 27 will assume the position shown in Figure 3 wherein the perforation 28 is between the O rings 26 and 27. Since stopper 17 is slightly spaced from the exterior of pipe 10, a small annular space 29 is provided which communicates with the chamber 15. Consequently when, as in Figure 2, the perforation 28 is between O ring 27 and chamber 15, the material within chamber 15 can enter the pipe 10 for dispensing purposes. The position shown in Figure 2 is referred to as the "open" position and the position of Figure 3 wherein the perforation 28 is sealed off from the space 29, is referred to as the "closed" position. When O ring 27 obstructs a portion of perforation 28, partial communication between chamber 15 and the pipe 10 is had providing a partially open position wherein a reduced quantity of material in chamber 15 enters the fluid stream of pipe 10.

The jacket 11 is axially retained on the pipe 10 by the annular bosses 30 and 31 formed peripherally on the pipe exterior. Consequently the jacket is free to rotate about the pipe but is restrained from relative axial motion.

The chamber 15 can be filled through an opening 32 which is sealed by a removable cap 33. Tapered annular bore enlargements 34 and 35 are provided along the inner edges of the stoppers thereby facilitating communication between chamber 15 and space 29.

The O rings are made from the conventional available materials. The shell 12, stoppers 13 and 14 and the pipe 10 can readily be fabricated from such materials as plastics, metals (aluminum, brass, copper, etc.), wood, rubber, etc.

In operation when clear water is desired rotation of jacket 11 to the closed position of Figure 3 prevents detergent from entering the pipe line stream. If a small quantity of detergent is desired in the fluid stream, the jacket is rotated until a portion of the hole 28 is between the O ring and the space 29 permitting partial access for the detergent into the fluid stream. A full 180° rotation from the closed position results in the open position of Figure 2 wherein detergent from chamber 15 is drawn into the fluid stream in pipe 10. If so desired indicating means may be provided on the pipe 10 corresponding to the various recited rotary positions.

A particularly useful application of the instant device is found in vehicle washing wherein alternate emersions of clear and detergent solutions are required. The simple rotary movements described provide the required alternate clear water and detergent emulsions or similar agents as desired.

Although the unit has been described in connection with the dispensing of insecticides and detergents, it is apparent that the dispensed substance does not to any degree restrict the broad inventive concept involved herein.

It is also apparent that the inventive objects are attained herein by a relatively simple inexpensive structure requiring a minimum of manual effort and time to operate. All of the component parts are replaceable without involving mechanical skill or appreciable effort.

It should further be understood that the various modifications resulting from changes in material, size, shape or rearrangements of the disclosed components are regarded as falling within the inventive scope.

Having thus described in detail the nature of the invention what is claimed as new and novel is as follows:

1. A dispensing unit adapted for connection to a fluid pipe line comprising a pipe and an outer jacket mounted rotatably thereon and including a reservoir for the substance to be dispensed into the pipe line including a passageway from the reservoir to the interior of the pipe including means responsive to rotation of the jacket relative to the pipe for controlling the flow of the said substance through the passageway, said means comprising an inclined sealing ring.

2. A dispensing unit adapted for connection to a fluid pipe line comprising a pipe and an outer jacket mounted rotatably thereon and including a reservoir for the substance to be dispensed into the pipe line including a passageway from the reservoir to the interior of the pipe including means responsive to rotation of the jacket relative to the pipe for controlling the flow of the said substance through the passageway, said means comprising an O ring in sealing relation with said pipe and jacket, the axis of said ring being at an inclination with respect to the axis of said pipe.

3. A dispensing unit adapted for connection in a pipe line comprising a pipe and an outer jacket swivelled thereon including a reservoir filled with a dispensable fluid substance encompassing the pipe including end walls with sealing means rotatably engaging the pipe periphery, in combination with a hole through the pipe in proximity with a portion of said sealing means whereby rotation of said jacket relative to the pipe causes reciprocation of the said portion across the hole whereby communication between the hole and the reservoir can be controlled, said portion of said sealing means comprising an inclined sealing ring.

References Cited in the file of this patent

UNITED STATES PATENTS

| | | |
|---|---|---|
| 920,914 | Christ | May 11, 1909 |
| 1,053,344 | Asbury | Feb. 18, 1913 |
| 1,242,905 | Atkinson | Oct. 16, 1917 |
| 1,517,926 | Weckesser | Dec. 2, 1924 |
| 1,763,236 | Hahn | June 10, 1934 |
| 2,717,176 | Osrow | Sept. 6, 1955 |
| 2,751,119 | Manning | June 19, 1956 |